US011238641B2

United States Patent
Parra Vilchis et al.

(10) Patent No.: US 11,238,641 B2
(45) Date of Patent: Feb. 1, 2022

(54) ARCHITECTURE FOR CONTEXTUAL MEMORIES IN MAP REPRESENTATION FOR 3D RECONSTRUCTION AND NAVIGATION

(71) Applicant: Intel Corporation, Santa Clara, CA (US)

(72) Inventors: Jose Parra Vilchis, Guadalajara (MX); Rafael De La Guardia Gonzalez, Guadalajara (MX); Rodrigo Aldana Lopez, Zapopan (MX); David Gomez Gutierrez, Tlaquepaque (MX); Leobardo Campos Macias, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/585,893

(22) Filed: Sep. 27, 2019

(65) Prior Publication Data
US 2020/0027262 A1 Jan. 23, 2020

(51) Int. Cl.
*G06T 15/08* (2011.01)
*G06T 17/05* (2011.01)
(Continued)

(52) U.S. Cl.
CPC .............. *G06T 15/08* (2013.01); *G06T 17/05* (2013.01); *G06T 19/003* (2013.01); *G06K 9/00664* (2013.01)

(58) Field of Classification Search
CPC ....... G06T 15/08; G06T 17/05; G06T 19/003; G06K 9/00664
See application file for complete search history.

(56) References Cited

U.S. PATENT DOCUMENTS

2007/0018993 A1\* 1/2007 Levene .................. G06T 15/04
345/582
2008/0234990 A1\* 9/2008 Bowers .................. G16C 10/00
703/1
(Continued)

FOREIGN PATENT DOCUMENTS

KR 20140019765 A 2/2014

OTHER PUBLICATIONS

Reichl et al. ("Memory-Efficient Interactive Online Reconstruction From Depth Image Streams", Computer Graphics Forum, vol. 35, 2016 (Year: 2016).\*
(Continued)

*Primary Examiner* — Kee M Tung
*Assistant Examiner* — Khoa Vu
(74) *Attorney, Agent, or Firm* — Schwegman Lundberg & Woessner, P.A.

(57) ABSTRACT

Systems and techniques for an architecture for contextual memories in map representation for 3D reconstruction and navigation are described herein. In an example, a system for contextual memory mapping is adapted to receive a data set of physical world sensor readings. The system may be further adapted to generate voxel data from the data set, the voxel data includes voxel coordinates and a physical world occupancy indicator. The system may be further adapted to select a block of addresses in the memory to store the voxel data. The system may be further adapted to generate a hash map to map voxel coordinates to memory locations in the block of addresses, the voxel coordinates having a contextual relationship that is maintained by the hash map. The system may be further adapted to store the voxel data at memory addresses based on the hash map.

23 Claims, 13 Drawing Sheets

(51) Int. Cl.
  *G06T 19/00* (2011.01)
  *G06K 9/00* (2006.01)

(56) References Cited

U.S. PATENT DOCUMENTS

| | | | |
|---|---|---|---|
| 2014/0267266 A1* | 9/2014 | Crassin | G06T 15/08 345/424 |
| 2015/0022521 A1 | 1/2015 | Loop | |
| 2018/0075643 A1 | 3/2018 | Sequeira et al. | |
| 2019/0236071 A1* | 8/2019 | Pishe | G06F 16/248 |
| 2019/0385355 A1* | 12/2019 | Xu | G06T 17/00 |
| 2021/0166464 A1* | 6/2021 | Moloney | G06T 15/005 |

OTHER PUBLICATIONS

Lessley et al. "Data-Parallel Hashing Techniques for GPU Architectures" University of Oregon, Jul. 18, 2019. (Year: 2019).*
"International Application Serial No. PCT/US2020/039099, International Search Report dated Sep. 25, 2020", 4 pgs.
"International Application Serial No. PCT/US2020/039099, Written Opinion dated Sep. 25, 2020", 6 pgs.

* cited by examiner

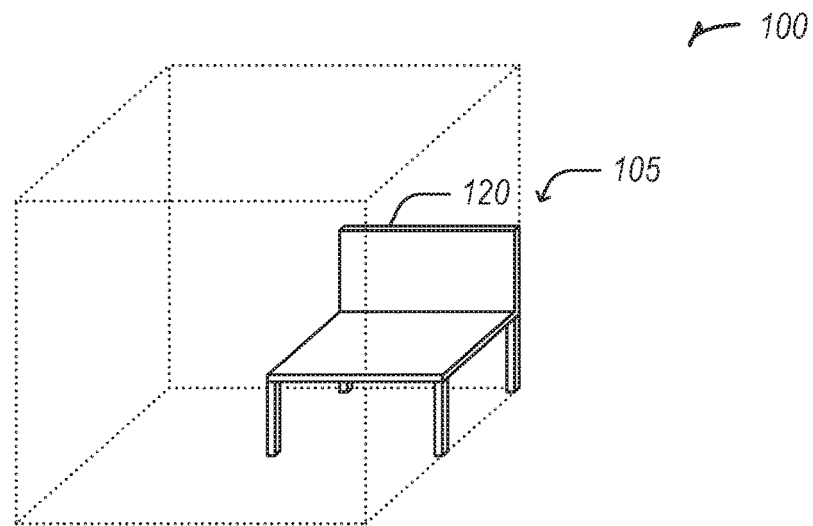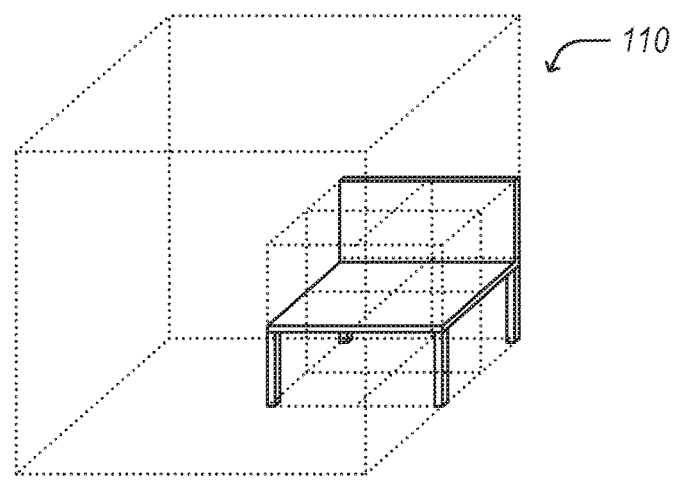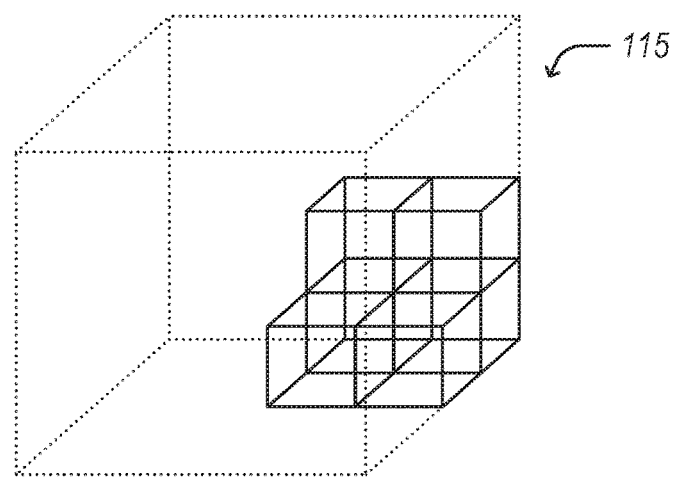
FIG. 1

FIG. 6

| ADDRESS | LEVEL | PROBABILITY | LABEL 1 | ... | LABEL N |
|---------|-------|-------------|---------|-----|---------|
| 00 00 | 0 | 0 | 0 | 0 | 0 |
| 00 01 | / | / | / | / | / |
| 00 10 | / | / | / | / | / |
| 00 11 | / | / | / | / | / |
| 01 00 | / | / | / | / | / |
| 01 01 | / | / | / | / | / |
| 01 10 | / | / | / | / | / |
| 01 11 | / | / | / | / | / |
| 10 00 | / | / | / | / | / |
| 10 01 | / | / | / | / | / |
| 10 10 | / | / | / | / | / |
| 10 11 | / | / | / | / | / |
| 11 00 | / | / | / | / | / |
| 11 01 | / | / | / | / | / |
| 11 10 | / | / | / | / | / |
| 11 11 | / | / | / | / | / |

605

610

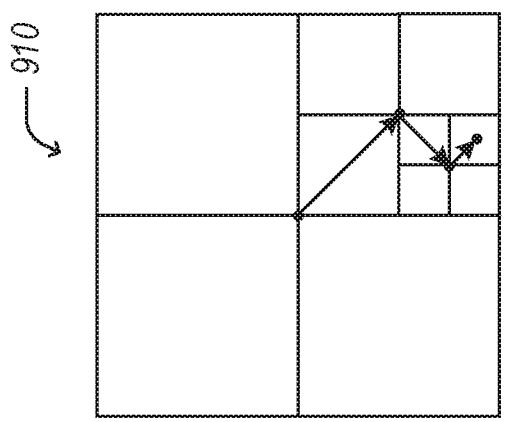
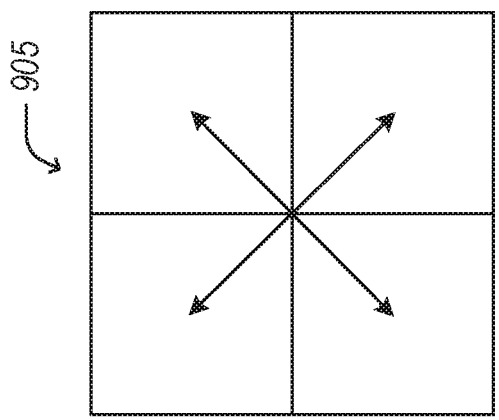
FIG. 9

1200

1202
RECEIVE A DATA SET OF PHYSICAL WORLD SENSOR READINGS

1204
GENERATE VOXEL DATA FROM THE DATA SET, WHEREIN THE VOXEL DATA INCLUDES VOXEL COORDINATES AND AN INDICATION OF PHYSICAL WORLD OCCUPANCY FOR EACH VOXEL COORDINATE

1206
SELECT A BLOCK OF ADDRESSES IN THE MEMORY TO STORE THE VOXEL DATA

1208
GENERATE A HASH MAP TO MAP VOXEL COORDINATES TO MEMORY LOCATIONS IN THE BLOCK OF ADDRESSES, THE VOXEL COORDINATES HAVING A CONTEXTUAL RELATIONSHIP THAT IS MAINTAINED BY THE HASH MAP

1210
STORE THE VOXEL DATA AT MEMORY ADDRESSES WITHIN THE BLOCK OF ADDRESSES IN THE MEMORY BASED ON THE HASH MAP

FIG. 12

ARCHITECTURE FOR CONTEXTUAL MEMORIES IN MAP REPRESENTATION FOR 3D RECONSTRUCTION AND NAVIGATION

TECHNICAL FIELD

Embodiments described herein generally relate to artificial intelligence for navigating a three-dimensional (3D) space and, in some embodiments, more specifically the storage in memory of the three-dimensional space representation.

BACKGROUND

When robots navigate using artificial intelligence (AI) in unknown scenarios, sensor data must be fused to reconstruct the environment and build a map estimate. Once the map estimate is built, it is used to perform motion planning and navigate paths for the robot to achieve its goal while navigating safely within the environment. As the robot navigates, the AI may access the stored map estimate.

These accesses to the map estimates take time and may slow down the robot's ability to navigate, especially for instances when timing is critical.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is an illustration of a 3D mapping of an object, in accordance with some embodiments.

FIG. 6 is a table map for a two-dimensional (2D) space, in accordance with some embodiments.

FIG. 9 illustrates approximated vector mapping in a two-dimensional space, in accordance with some embodiments.

FIG. 12 illustrates a flowchart showing a technique for a contextual memory architecture system, in accordance with some embodiments.

DETAILED DESCRIPTION

Figure 2:
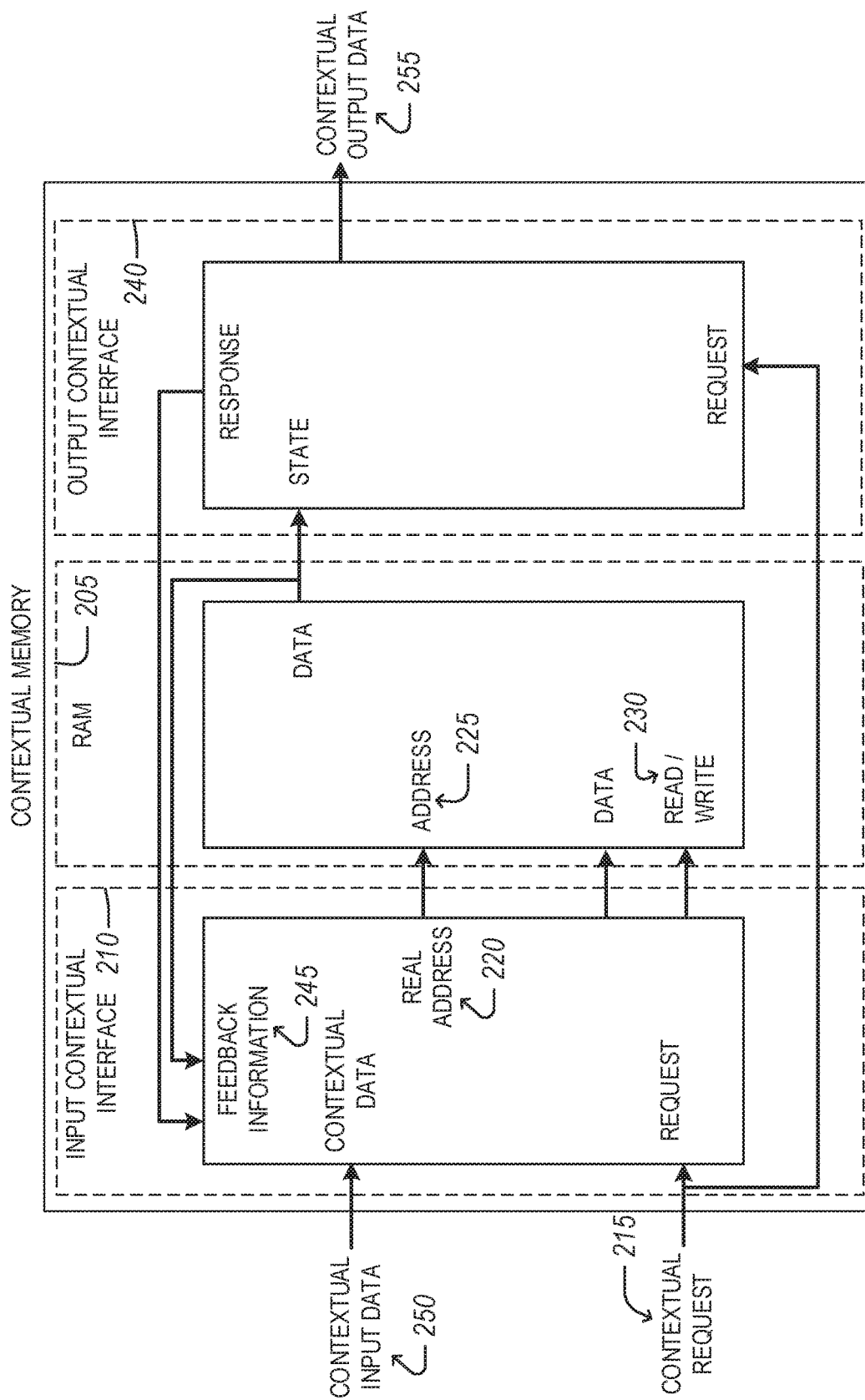
FIG. 2 is an illustration of contextual memory architecture system, in accordance with some embodiments.

Using sensor data, a map of a 3D space may be constructed. The AI may encounter bottlenecks to efficiently use the map information. For example, bottlenecks may include collision checking with the objects of the map and context-based search of voxels, voxels' information, and neighbor voxels' state (e.g., searching by coordinates instead of memory address). These actions require multiple memory accesses in order to take into account properties of the 3D space and efficiently handle the uncertainty and the free space in neighbor areas.

Previous solutions may include managing sensor data and environment mapping in software data structures such as a point cloud, grid maps, octrees or others. These solutions' access to data and memory allocation, normally implemented in a software stack, depend heavily on the type of data structure that is being used.

Disadvantages of previous solutions are tightly coupled with the data structures used. A point-cloud data structure stores very large amounts of measurements. For a point cloud, each measurement stores at least a three point coordinate location plus any desired extra descriptors for the measurement. Grid map data structures may provide for fast data access as they may be implemented with array-type structures but they also require a large amount of memory to represent maps with good resolution Octrees data structures have a tradeoff between memory allocation and data access. For octrees, to search for a specific location, a search goes through the data structure and voxels are not necessarily located in adjacent memory locations. The main tradeoffs reside in memory allocation and data structure information access. The main bottlenecks are in collision checking and search through the map which may require multiple memory access to get all the necessary information.

The presently disclosed system and methods use a contextual memory architecture system for 3D map representation, collision checking, and contextual-based searches. The contextual memory architecture system may be used together with hardware accelerators for efficient management of the 3D map representation. The contextual memory architecture system may enable agile navigation of autonomous agents, such as autonomous cars, drones, and service robots, in unknown environments as well as with 3D reconstructions. The general architecture of the contextual memory architecture system may be extended to other domains where a more efficient management of contextual information is needed (e.g., similar information located in near regions of memory). Other contextual information different from space coordinates may be red, green, blue (RGB) color, object classification, and other identifiers.

An example application may be a robot that is attempting to navigate a space. In this example, the robot and the objects in the space are the context. The contextual memory architecture system may receive points in the space (voxels) that indicate an object from various sensors. Sensors such as cameras, depth cameras, radar, and light detection and ranging (LIDAR) may be used to identify an object occupying a space. The data received from the sensors is used to determine if a point in the space is occupied or not, and thus if the robot may move to that point or if the robot will collide with an object, such as a wall. The contextual memory architecture system uses a hash function with the received point data and maps the data to the memory in a contextual manner such that points in space located near each other are also located near each other in memory.

The context of the contextual memory architecture system is that points in Euclidian space that have a special relationship with each other share a special context with each other. For example, points on a wall share a context. Thus, the locality or closeness of points or positions in the 3D real world provides the context closeness to search for related points which share the context. The points that have a similar context in the real world should also have a relationship in the memory space that may be exploited for accessing the points, or positional data.

The contextual memory architecture system uses a memory subsystem along with a contextual input layer which translates between context information and memory addresses, and an output layer which interprets the memory data. Voxels may be stored in the memory with an allocation distribution that allows efficient neighbor calculation and provides a high hit rate in a cache memory if the correct memory hierarchy is used in the random access memory (RAM) subsystem. As a result, neighbor coordinates may be located in contiguous memory address. The input and output layer may be hardware accelerators provided to efficiently translate context and spatial information to addresses of the memory and to handle uncertainty about the state of individual voxels.

The contextual memory architecture system may provide faster contextual search as memory addresses are mapped directly to the position of the voxels in a multi-resolution map. To search different resolutions of the same space, masks may be applied to the complete address search input. The contextual memory architecture system may provide data access velocity, such that smaller discretization voxels and neighboring voxels are located in adjacent memory addresses.

Additionally, the contextual memory architecture system may provide an occupancy check of a voxel and neighboring voxels through embedded information in the memory. Occupancy, or an occupied voxel, designates an area in the real world where an object exists or, in other words, where the space is not empty. A hardware-based implementation of the contextual memory architecture system may provide for the usage of a complex map representation through contextual memories in low-level systems, such as lightweight mobile robots or systems with low-level processing or memory capabilities.

FIG. 1 is an illustration of a 3D mapping 100 of an object 120, in accordance with some embodiments. The 3D mapping 100 begins with object 120, such as a chair, in a 3D space 105. Cameras and other sensors may be used to identify the object 120 exists at certain points in the 3D space 105. These points are mapped to voxels in a 3D mapping. Representation 110 is an overlay of the 3D mapping voxels and the real-world 3D space including the object 120. 3D mapping 115 illustrates the data mapping in voxels of the object 120. 3D mapping 115 is a low discretization level mapping of object 120 as the size of the voxels in 3D mapping 115 occupy more representative space than the actual object 120. Through additional discretization, the voxels become smaller and the object 120 is better represented in a 3D mapping. In other words, further discretization increases the 3D representation resolution leading to a finer definition of the occupied space.

FIG. 2 is an illustration of contextual memory architecture system 200, in accordance with some embodiments. The contextual memory architecture system 200 has two additional hardware layers around the RAM 205 in such a way that the data path between the software application and the memory passes through these two interfaces. The first hardware layer may be the input contextual interface 210 which translates the contextual request 215 by the software application to a real address 220 to identify the address 225 in the RAM 205. The input contextual interface 210 may translate read/write operations 230 for the mapping with low-level operations such as increasing resolution or multiple read/write operations on the RAM 205.

The input contextual interface 210 may perform the mapping of input data into the memory. The input contextual interface 210 may receive contextual input data 250. The input contextual interface 210 may use a map function (of hash mapping) to map the contextual input data 250, such as a coordinate, to a real address 220 in memory. The contextual input data 250 is written, through the use of the map function, to the RAM 205 in a contextual manner such that contextual or relative data is contextually stored in the RAM 205. For example, neighboring coordinate input data or data representing the same object, such as a wall, is contextually stored in the memory The second hardware layer may be the output contextual interface 240 which interprets the data contained in the RAM 205. This interpretation may be used as feedback information 245 to the input contextual interface 210 in order to perform sequential read/write operations within a single application command (e.g., context-based coordinate searches in the memory). An example of this data interpretation may be a search for a neighbor voxel of a specific coordinate which minimizes a metric calculation. The output contextual interface 240, based on the interpretations from the RAM 205 may produce contextual output data 255, such as data about the real-world occupancy of a coordinate and neighboring coordinates.

Figure 3:
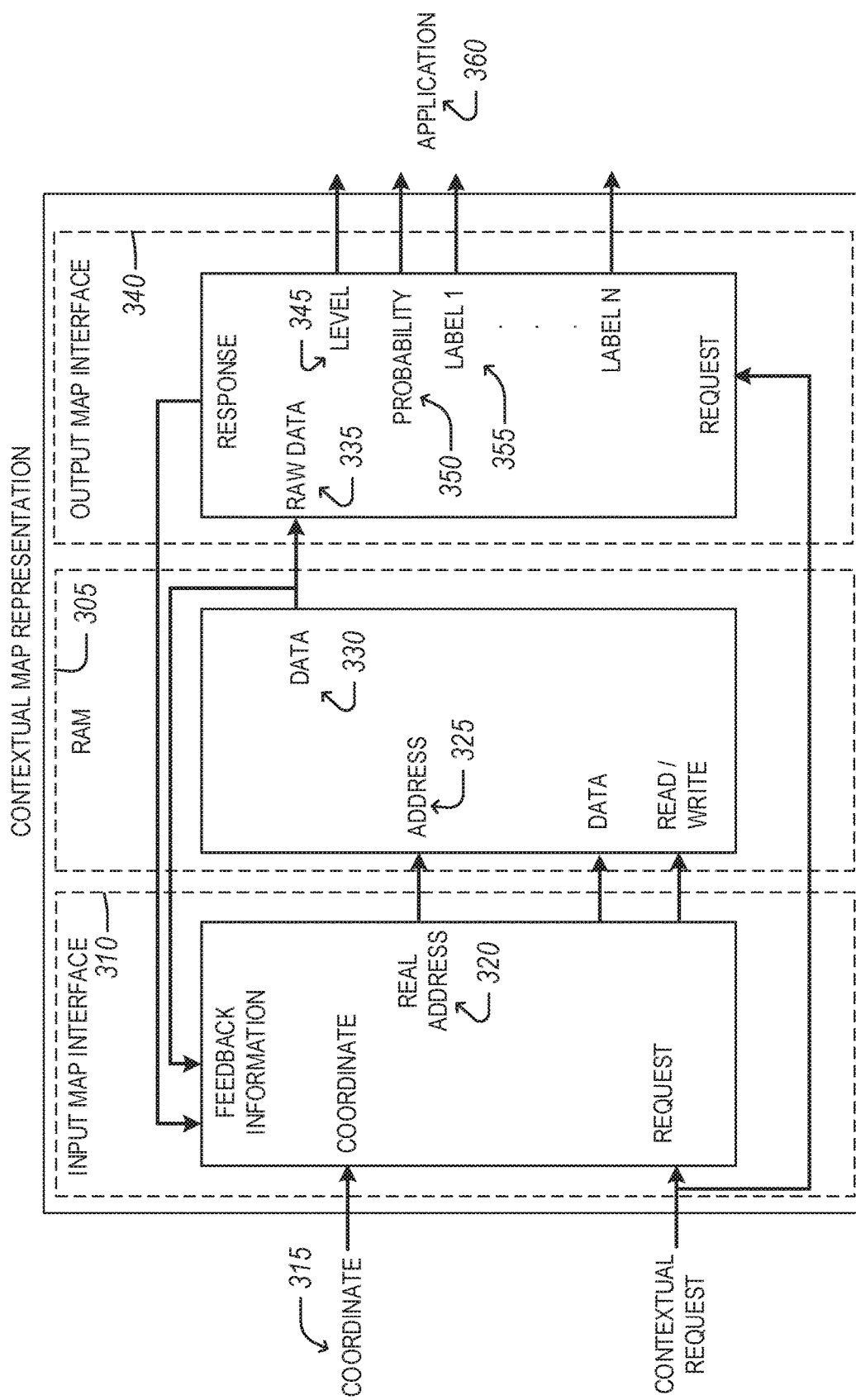
FIG. 3 is an illustration of contextual map representation for memory, in accordance with some embodiments.
Figure 4:
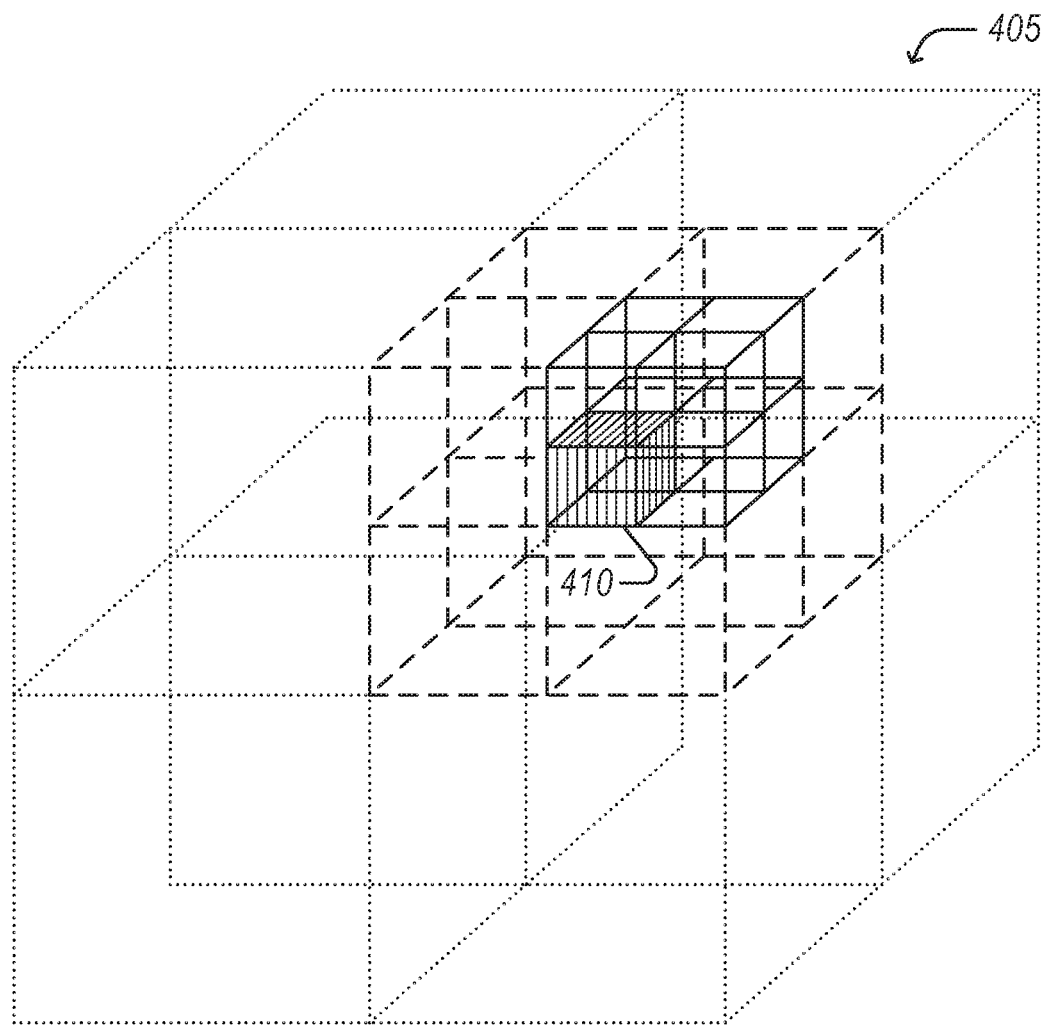
FIG. 4 is an illustration of voxel map with different discretization levels, in accordance with some embodiments.

FIG. 3 is an illustration of contextual map representation 300 for memory, in accordance with some embodiments. The contextual memory architecture system for a contextual map representation 300 may be used to represent an occupancy map in an efficient way. For example, by providing fast accesses and fast writes to the memory by way of the map, navigation speed for a robot may be improved. An occupancy map may be represented as voxels with certain discretization steps. In order to group multiple voxels that represent free space multiple discretization levels may be used. FIG. 4 provides an example of multiple discretization levels in a voxel map.

As an example, an application does not know exactly where the location of a certain voxel is in memory. However, when the application wants to read the properties of a voxel it is natural to query the properties by the voxel coordinate 315. Using the contextual memory architecture system, the input map interface 310 may perform a translation between coordinates 315 and memory addresses 325 in the RAM 305. The input map interface 310 may receive coordinate 315 and use a hash map to determine the real address 320 which is the memory address 325 in RAM 305.

A read of the data 330 at memory address 325 occurs and may be provided as raw data 335 to the output map interface 340. The output map interface 340 may parse the raw data 335 for the data relevant to the application 360, such as the discretization level 345, the occupancy probability 350, and labels 355. Labels 355 may be used to identify the object corresponding to the coordinate 315, such as a wall or a table, or may include other qualities of the object such as a color.

The contextual memory architecture system may use a map function, such as a hash map, between coordinates in space to memory addresses. The contextual memory architecture system takes advantage of how the memory hierarchy works to use hash functions to apply directly to the memory, and may provide efficient hash calculations by intelligently distributing voxels in the memory. For example, the contextual memory architecture system may use a hash map to group voxels within the same area nearby in memory.

This may provide a simple way to calculate the hash function using additions, shifts, and masks, which may be considered simple operations with low resource usage.

FIG. 4 is an illustration of voxel map 405 with different discretization levels, in accordance with some embodiments. In the voxel map 405, each voxel is represented by a coordinate, which occurs at the center of the voxel. The data stored for each voxel may include a reference frame, a probability of occupation, the discretization level, and other contextual fields that might contain sematic information, such as what the occupied voxel represents (e.g., part of a wall, a person). The voxel map 405 represents free space voxels with the exception of shaded voxel 410. Shaded voxel 410 represents an occupied voxel. The large free space cubes represent voxels with low discretization. Shaded voxel 410 and the neighboring voxels of the same size represent voxels with high discretization.

Figure 5:
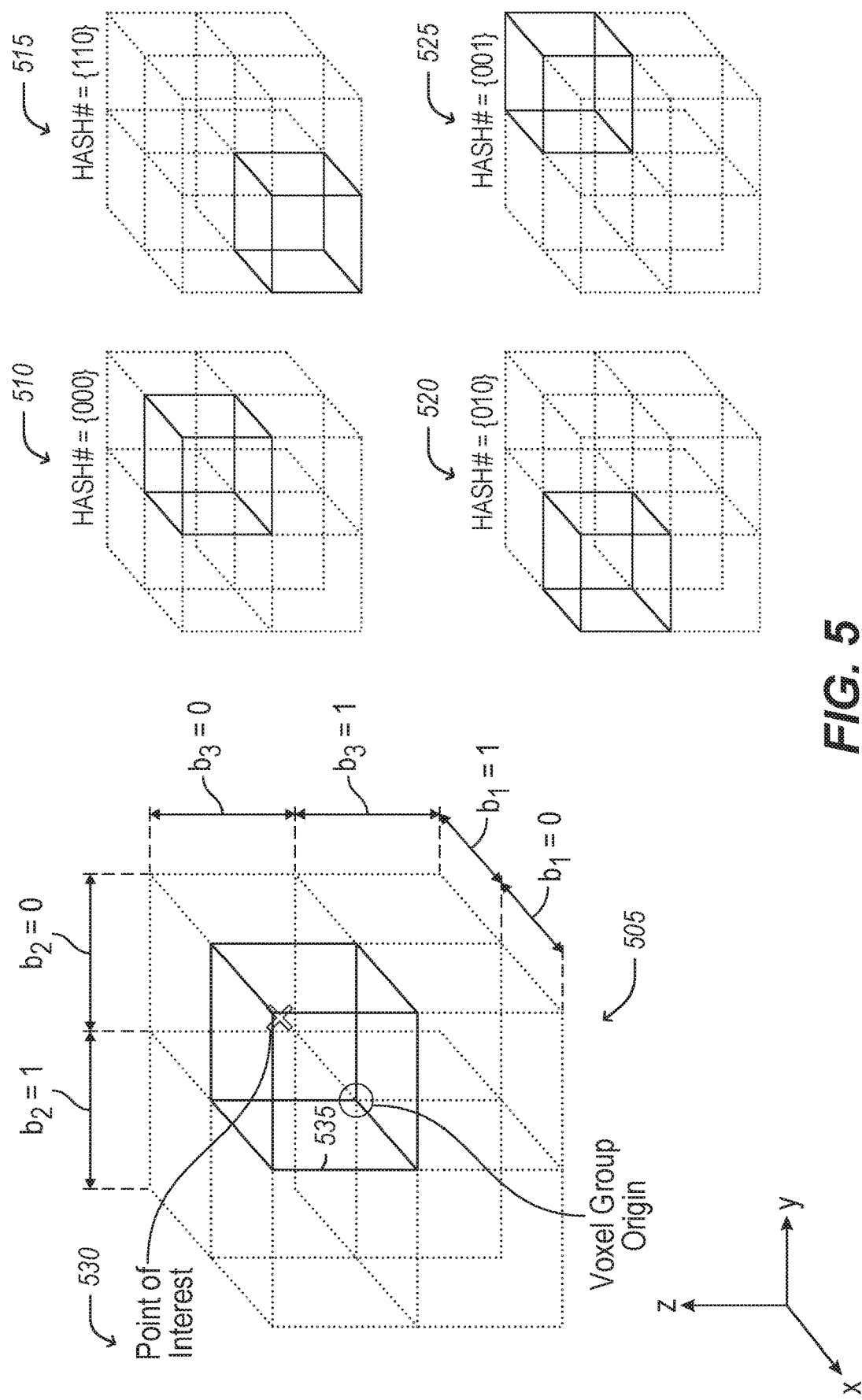
FIG. 5 is an illustration of a 3D space with a first level discretization, in accordance with some embodiments.

FIG. 5 is an illustration of a 3D space with a first level discretization, in accordance with some embodiments. For a 3D space, a hash function may be calculated for the position of the voxels with respect to a center. For 3D space 505, and using a Euclidian coordinate system, the hash key may have a length of 3 bits: $\{b_3 b_2 b_1\}$, where each bit represents the relative position (positive/negative) along a particular coordinate plane with respect to a certain voxel group origin.

For example, the point of interest 530 is located in the outlined voxel 535. The outline voxel 535 is located positive in the x-direction, positive in the y-direction, and positive in the z-direction, therefore the local hash key is b'000 as represented with voxel hash 510. Voxel hash 515, Voxel hash 520, and Voxel hash 525 illustrate examples of additional hashes for a first level discretization of the 3D space 505. Voxel hash 515 illustrates a voxel located in positive in the x-direction, negative in the y-direction, and negative in the z-direction, therefore the local hash key is b'110. Voxel hash 520 illustrates a voxel located positive in the x-direction, negative in the y-direction, and positive z-direction, therefore the local hash key is b'010. Voxel hash 525 illustrates a voxel located negative in the x-direction, positive in the y-direction, and positive in the z-direction, therefore the local hash key is b'001.

FIG. 6 is a table map for a 2D space, in accordance with some embodiments. The hash keys within voxel groups may be concatenated to represent a voxel in different levels of discretization. For explanation and illustrative purposes, a 2D space and 2D map is represented for FIGS. 6, 7, and 8. 2D space 605 is a single voxel. In relation to real-world representation, this may occur when there is nothing occupying 2D space 605, and thus no need for further discretization exists. The map 610 represents a single big voxel, such as 2D space 605. With such a mapping as map 610, no matter what coordinate is queried, the resulting hash key corresponds to the first address b'0000. For map 610, the level is 0 and this value is stored in memory. In this way, when a coordinate is retrieved, this address is read first and compares the level value to identify if further level search should be performed.

Figure 7:
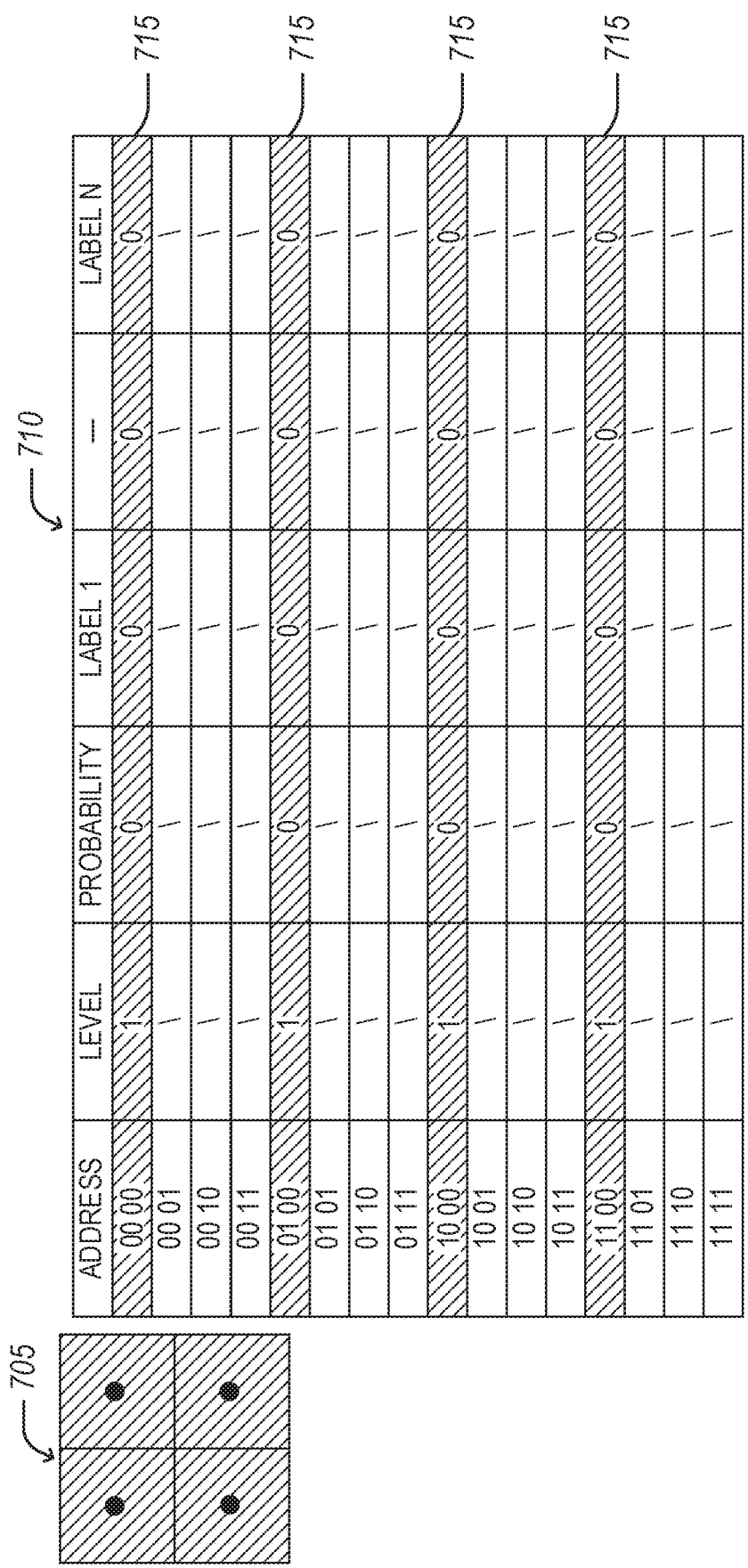
FIG. 7 is a table map for a 2D space, in accordance with some embodiments.

FIG. 7 is a table map for a 2D space, in accordance with some embodiments. 2D space 705 is discretized another level from the 2D space 605. For map 710, the first two bits of the address represents the hash key with respect to the origin of these voxel group. Converting a coordinate using hash key, or map 710, maps only to the shaded memory slots 715. Shaded memory slots 715 store a 1 in the level field to indicate no more discretization than 1 is needed. In other words, a read of memory address b'0001 will not be performed as the level value of 1 in the level field indicates the discretization does not go to a second level and all data related to the first quadrant (voxel) of 2D space 705 is stored at the b'0000 address.

Figure 8:
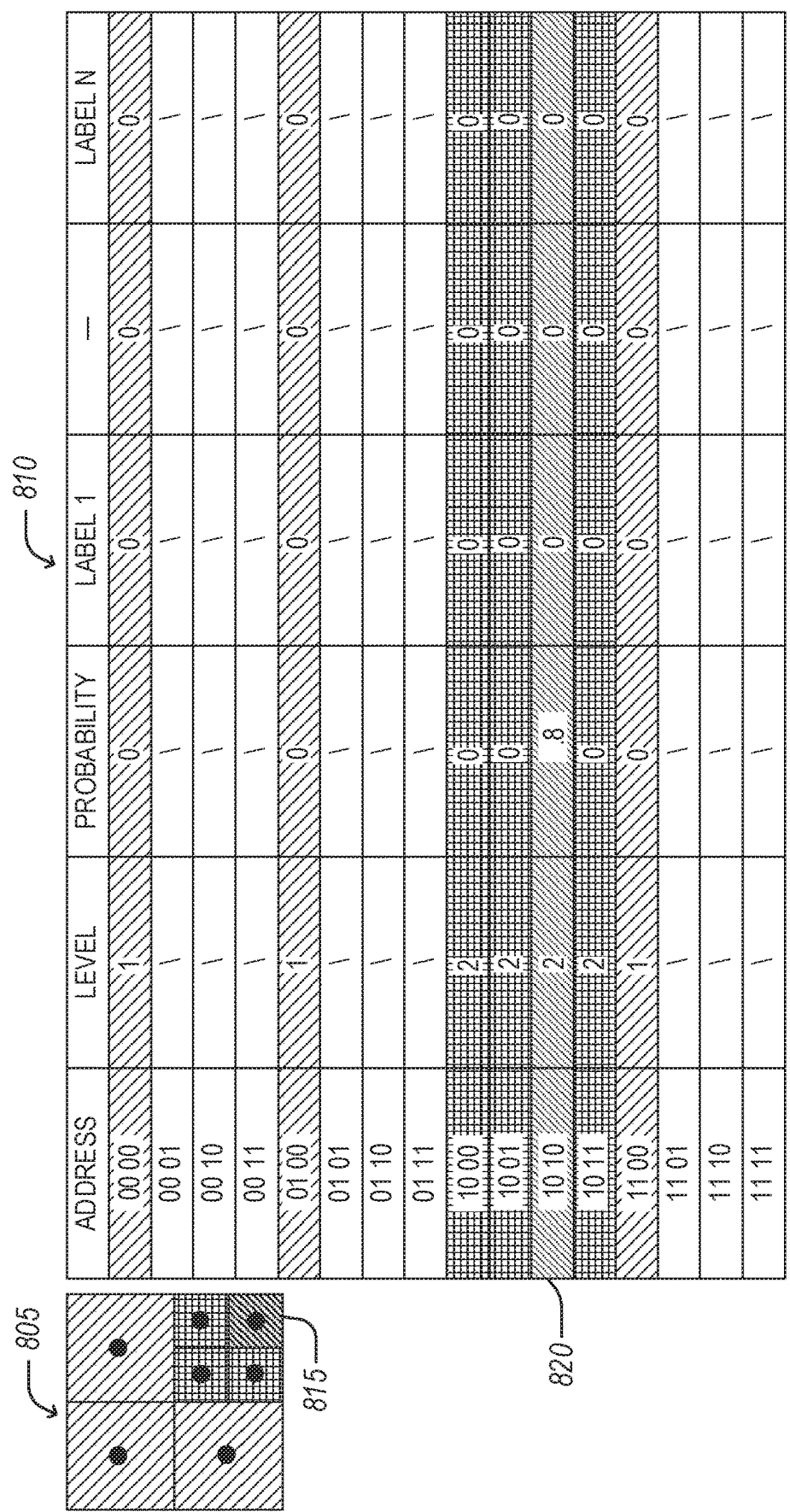
FIG. 8 is a table map for a 2D space, in accordance with some embodiments.

FIG. 8 is a table map for a 2D space, in accordance with some embodiments. In 2D space 805, one voxel from 2D space 705 is discretized at an additional level. In the map 810 of 2D space 805, the voxels within an area of second level discretization still have the same first two bits of the address, but second two bits represent the hash key with respect to these voxels' origin. With the level field value of 2, the address 1000 no longer represents a voxel of level 1, but a voxel of level 2 with a different center coordinate encompassing a smaller coordinate area. In 2D space 705, address 1000 with level value of 1 was the whole lower right quadrant. In 2D space 805, address 1000 with level value 2 is only the upper left quadrant of the lower right quadrant, with memory addresses 1001, 1010, and 1011 storing data for the other three quadrants of the lower right quadrant of 2D space 805.

In an example, if an object was detected in quadrant 815 of the 2D space 805, then this information may be stored in the memory corresponding to quadrant 815. Memory slot 820 of address 1010 corresponds to quadrant 815. Based on the sensor data received a probability is determined if the real world space is occupied. The more sensor data received, the higher the probability may be. In the example, the probability field of memory slot 820 includes a value of 0.8 indicating there is high probability that an object was detected and the real-world space of quadrant 815 is occupied.

For an application to read or make a query about a certain coordinate, may take two courses from the application point of view. In the first course, the application may not know the discretization of the region around the coordinate, thus the application may not know where to look in the memory. In this case a search may be performed by passing the coordinate through the hash function and then using masks by groups of 3 bits (in a 3-dimensional map) to sequentially look in the memory.

For example, this process may begin with the coordinate being quantized according to the desired minimum discretization step. The hash function may be calculated by subtracting a voxel center stored in a look up table and is dependent upon the current level. A mask may be applied. If no discretization has been performed in the map, then this address contains the one mapped voxel. The level field value stored at this address may be returned to the application to compare if a deeper search should be performed. For example, if the level field stored at the address doesn't match, the level register may be incremented and the mask may be shifted by N (e.g., where N is dimensions of the space, thus for 3D N=3) times. For example, the mask=b'111000..000 with the three leading 1's masking the hash number, leaving only the N most significant bits.

The second course may be where the voxel level is known. This results in a single query instead of sequential query where the corresponding mask is applied. This may be equivalent to a direct memory reading, such as through a virtual memory translation, where the input memory address is the coordinate and level, and the output is the real memory address.

FIG. 9 illustrates approximated vector mapping in a two-dimensional space, in accordance with some embodiments. Recovering the coordinate of a voxel given the address may not result in an exact coordinate as the hash function may not be a 1-1 operation of all points in the 3D space and memory addresses. Instead, a group of coordinates may be mapped to a single address, depending on the resolution or discretization level. The inverse mapping may be approximated by mapping the address to the center of the voxel it corresponds, with consideration of the voxel level. The inverse mapping hash may be that within a center of a voxel, the voxel's child voxels are the sum of the voxel center plus one of the eight vectors in a 3D representation, where the length of theses vectors are half of the diagonal of the "parent" voxel. Thus, any coordinate that falls within the vector's length from the voxel center coordinate may be mapped to that voxel.

Two-dimensional space 905 illustrates the four vectors for the 2D child voxels. This is repeated for the children of the child voxel. Hence, the coordinate represented in block of three bits $\{B_1, B_2, \ldots, B_{N-1}\}$ may be converted by adding up recursively these vectors, each one half of the last one, and each block of three bits select which of the vectors should be chosen. Two-dimensional space 910 illustrates the recursive process of identifying the center of the voxel using vectors. This may be performed where the vectors are stored in a look up table with a nominal length, but each vector is added to the others and divided by a different power of two.

Figure 10:
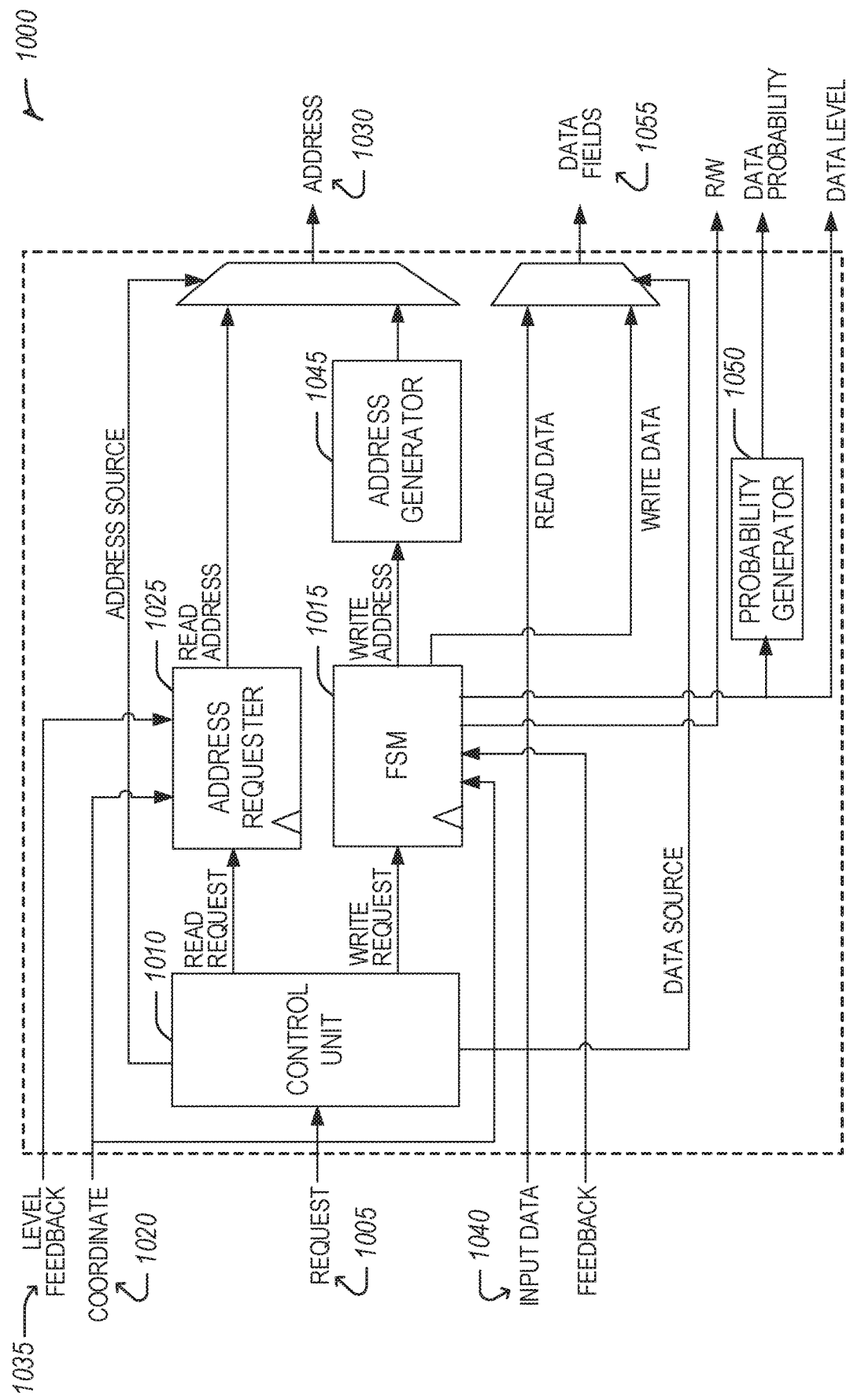
FIG. 10 illustrates the input contextual interface, in accordance with some embodiments.

FIG. 10 illustrates the input contextual interface 1000, in accordance with some embodiments. The input contextual interface 1000 or input map interface may receive a command for a request 1005 from the memory. The request 1005 may be interpreted by the control unit 1010 which along with a finite state machine 1015 identifies the data path for every command or request. The control unit 1010 may interpret requests 1005, where the control unit 1010 receives a request, interprets the command of the request, and determines if the request is a read request or a write request. Based on the determination, the request may be a read request and is sent to the address requester 1025 or the request may be a write request and is sent to the finite state machine 1015 and then address generator 1045.

The address requester 1025 and address generator 1045 may each use the hash map to determine the address for the respective read or write. For example, when a read request is received by the address requester 1025, the address requester 1025 may use the hash map with the provided coordinate 1020 to determine the address 1030 in memory to read. Similarly, the address generator 1045 may receive a write request which includes a coordinate 1020 provided by the finite state machine 1015. Using the coordinate 1020 and hash map, the address generator 1045 may determine, or generate, the address 1030 in memory to write the input data 1040, such that the data is written contextually to the memory.

One command may be a map read request where there is no level information provided for a particular coordinate 1020. The selected data path for coordinate 1020 request may be the address requester 1025 and a read operation to the RAM based on the determined address 1030. This may provide level feedback 1035 of the level field to determine if another search cycle must be performed.

A write request operation is used to input data 1040 via sequential direct writes using the address generator 1045. When input data 1040, such as a voxel, is written, it may be written to generate a structure as seen in FIG. 8. A write command may be of the type "occupied" or "not occupied". For example, a point cloud may provide information of presence of objects at a certain coordinate, but because of possible inaccurate or false positive reads from sensor, this may not be certain. A probability evaluation generator 1050 may be used to handle the uncertainty or determine the probability of accuracy of the sensor data. For each time an "occupied" write is requested, the occupancy probability is increased, or decreased in the case of a "non-occupied" write. This increase/decrease dynamic equation may vary based on probabilistic models. An example probabilistic model may be $p[n+1]=p[n]+k(1-p[n])$ for occupied and $p[n+1]=(1-k)p[n]$ for non-occupied. These equations are examples of a first order infinite impulse response (IIR) filter which increases or decreases with exponential rates, being bounded by 0 and 1.

Each data input 1040 or write request may include contextual information that is written to the data fields 1055 of the voxel, such as color, distance to a certain goal or labels identifying an object (e.g., wall, person, table, tree).

Figure 11:
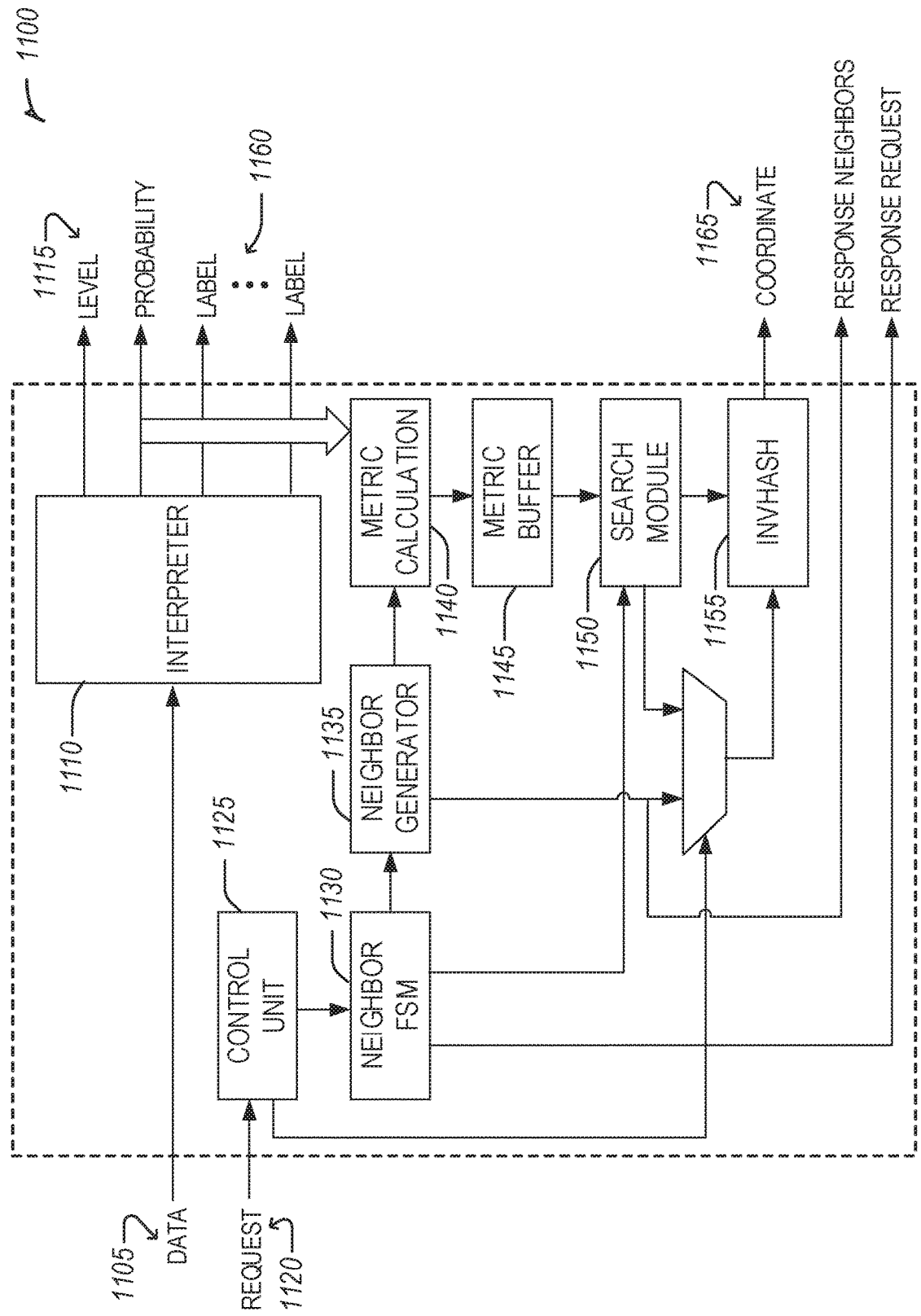
FIG. 11 illustrates the output contextual interface, in accordance with some embodiments.

FIG. 11 illustrates the output contextual interface 1100, in accordance with some embodiments. The input contextual interface 1000 handles translation between contextual requests, the output contextual interface 1100, or output map interface, handles interpretation of output data 1105 from the memory. The output data 1105 may be received by an interpreter 1110 which separates the memory line data for the application. The level field 1115 rendered by the interpreter 1110 may be used by the application but may also be used as feedback to the input contextual interface 1000.

A contextual request 1120 may be for a neighbor search. For example, a request 1120 may be to find the neighbors around a certain coordinate that minimizes a certain field (or combination of fields) stored in the voxels. This may be performed using a metric calculation and a method to search for neighbors. However, the output contextual interface 1100 may have a mechanism to convert between coordinates and addresses and avoid looking in the entire memory map. Neighbors may be found by taking the interest voxel coordinate (translated back from the address), and adding a vector based on the length of the voxel plus a value equal to the minimum discretization level. Based on the discretization level, the value is essentially an offset between voxels. The value may be used to identify neighbors of the voxels by applying the value as an offset in a Cartesian direction to the voxel coordinate. If the neighbor is at an equal or lower level (is of equal or higher size), then a query for the address of this coordinate using an address requester 1025 from the input contextual interface 1000 results in the address in memory of the neighbor. If the level of the neighbor(s) is higher (the size of the neighbors is lower) then, all the voxels in the same section (filtered by adjacency) are neighbors of the voxel.

This sequential process of searching for neighbors can be easily implemented using a finite state machine (FSM) 1130. A neighbor search request 1120 may be received by the control unit 1125. The neighbor FSM 1130 and neighbor generator 1135 may identify possible neighbor addresses. Neighbor addresses and data can be stored in a metric buffer 1145 and based on a certain metric calculation, a search module 1150 may look for the lowest value of the metric in the list. This metric can be a configurable combination of the labels 1160 in the actual voxel. For example, a cost function based only on the occupation probability, or a combination of the probability, the level, and other contextual information such as distance to another voxel. This may be used as heuristic for path planning algorithms, as with a single read request, information of the next neighbor in the path may be available. Finally, this output map layer contains an inverse hash function 1155 to translate the real address to the actual context, which may be an application working with the coordinates 1165.

One of the aspects of the memory organization in the contextual memory architecture system is that voxels near the same area, when viewed in the maximum discretization are placed near some of their neighbors (as seen in map 810 of FIG. 8). Moreover, voxels in the same memory section (and in the same area) may share almost the same address, just differing in some bits. This may be particularly useful when used with a memory hierarchy architecture for the RAM. For example, a cache memory may be placed between the RAM input and the DRAM. If the cache memory uses spatial locality features, such as where one read request fetches a whole group of addresses around the requested address, then by fetching one voxel, some neighbors may also be available in the cache, improving speed and hit rate of the cache. This is possible, as by the very structure of the contextual memory architecture system it is more probable that a neighbor of previously requested voxel is accessed.

FIG. 12 illustrates a flowchart showing a technique 1200 for a contextual memory architecture system, in accordance with some embodiments. The technique 1200 includes an operation 1202 to receive a data set of physical world sensor readings. The physical world sensor readings may be information about objects in the physical world where the location data is relative to a device or robot with an artificial intelligence navigation system. The technique 1200 may further include an operation to receive a plurality of physical world sensor readings for each physical world space, such that multiple sensor readings are provided for different physical world locations. The physical world sensor readings may be provided by a camera, a depth camera, radar, a Light Detection and Ranging (LIDAR) device, sonar, or any other sensor capable of capturing the presence of physical objects and structures. The physical world sensor readings may identify a type of object, such as a wall, a desk, a vehicle, etc. The physical world sensor readings may identify color, distance to an object, or physical attribute of the object.

The technique 1200 includes an operation 1204 to generate voxel data from the data set. The voxel data may include voxel coordinates and an indication of physical world occupancy for each voxel coordinate. The physical world occupancy indicates, for example, if an object is present in (or occupies) the physical world at the space corresponding to the voxel data. The technique 1200 includes an operation 1206 to select a block of addresses in the memory to store the voxel data. The block of addresses in the memory may be a sequential block of addresses in the memory.

The technique 1200 includes an operation 1208 to generate a hash map to map voxel coordinates to memory locations in the block of addresses. The voxel coordinates may have a contextual relationship that is maintained by the hash map. The hash map maintains a relationship where the proximity of voxel coordinates relates to the proximity of memory address space in the block of addresses. The hash map maps the contextual relationship between the block of addresses and coordinates of the voxel data. The hash map may translate the coordinate data to a memory address such that coordinates with contextual relevance in the physical world are stored in the memory with a similar contextual relevance.

The technique 1200 includes an operation 1210 to store the voxel data at memory addresses within the block of addresses in the memory based on the hash map. The voxel data may indicate a probability of physical world occupancy. The technique 1200 may further include an operation to determine the probability of physical world occupancy based on the plurality of physical world sensor readings. Each sensor reading for a location in the physical world may be used to adjust the probability of an object occupying the physical world location. For example, if five sensor readings are provided for a physical world location and four of the five indicate an object is occupying the location, then the probability may be 0.8 or 80%. The voxel data may include a level of discretization. The level of discretization may indicate if a finer level space definition exists. The type of object, color, distance to an object, or physical attribute of the object may be stored with the voxel data. The voxel data may include a distance to a certain goal, semantic labels, or other measured attributes of the physical world captured or inferred by the sensors.

The technique 1200 further includes an operation to receive a plurality of physical world sensor readings for a physical world space. The technique 1200 further includes an operation to determine the probability of physical world occupancy based on the plurality of physical world sensor readings. Receiving at least one physical world sensor reading corresponding to a voxel coordinate indicating a corresponding physical world space is occupied may increase the probability of physical world occupancy for the voxel coordinate. Receiving at least one physical world sensor reading corresponding to a voxel coordinate indicating a corresponding physical world space is not occupied may decrease the probability of physical world occupancy for the voxel coordinate The technique 1200 further includes an operation to receive a coordinate request. The coordinate request may include a coordinate and the coordinate identifies a physical world space. The technique 1200 further includes an operation to identify a memory address corresponding to the coordinate using the hash map. Identifying the memory address may include using the level of discretization with the hash map. The technique 1200 further includes an operation to return voxel data from the memory address that may indicate whether the physical world space identified by the coordinate is occupied or not occupied by a physical object or structure.

The technique 1200 may further include an operation to identify a second memory address corresponding to the coordinate using the hash map and the level of discretization. Based on the level of discretization, an additional memory read may be performed to identify the most precise voxel data which includes the coordinate. The technique 1200 may further include an operation to return voxel data from the second memory address indicating the physical world space identified by the coordinate is occupied or not occupied by an object.

The technique 1200 further includes operations to read data stored at a memory addresses within the block of addresses and determine a coordinate relating to a physical world space using the data and an inverse hash map.

Figure 13:
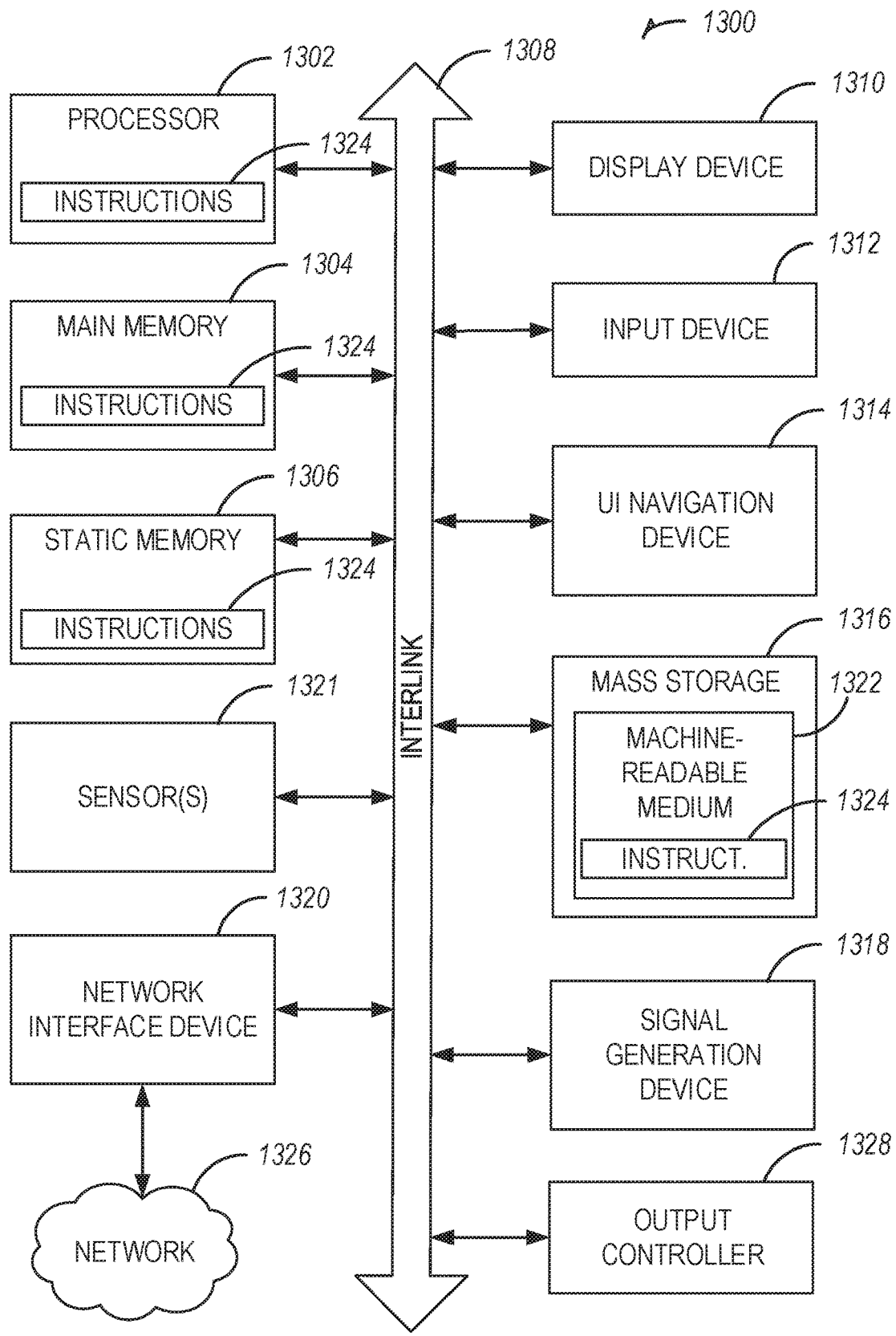
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1300 may include a hardware processor 1302 (e.g., a central processing unit (CPU), a graphics processing unit (GPU), a hardware processor core, field programmable gate array (FPGA), or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or used by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300, and includes digital or analog communications signals or other intangible medium to facilitate communication of such software.

Example 1 is a system for contextual memory mapping, comprising: at least one processor; and memory including instructions that, when executed by the at least one processor, cause the at least one processor to: receive a data set of physical world sensor readings; generate voxel data from the data set, wherein the voxel data includes, voxel coordinates and an indication of physical world occupancy for each voxel coordinate; select a block of addresses in the memory to store the voxel data; generate a hash map to map voxel coordinates to memory locations in the block of addresses, the voxel coordinates having a contextual relationship that is maintained by the hash map; and store the voxel data at memory addresses within the block of addresses in the memory based on the hash map.

In Example 2, the subject matter of Example 1 includes, wherein the voxel data includes a level of discretization.

In Example 3, the subject matter of Example 2 includes, instructions to: receive a coordinate request, wherein the request includes a coordinate, wherein the coordinate identifies a physical world space; identify a memory address corresponding to the coordinate using the hash map; and return voxel data from the memory address indicating whether the physical world space identified by the coordinate is occupied.

In Example 4, the subject matter of Example 3 includes, wherein identifying the memory address includes using the level of discretization with the hash map.

In Example 5, the subject matter of Examples 1-4 includes, wherein the voxel data indicates a probability of physical world occupancy.

In Example 6, the subject matter of Example 5 includes, instructions to: receive a plurality of physical world sensor readings for a physical world space; and determine the probability of physical world occupancy based on the plurality of physical world sensor readings.

In Example 7, the subject matter of Example 6 includes, wherein receiving at least one physical world sensor reading corresponding to a voxel coordinate indicating a corresponding physical world space is occupied increases the probability of physical world occupancy for the voxel coordinate.

In Example 8, the subject matter of Examples 6-7 includes, wherein receiving at least one physical world sensor reading corresponding to a voxel coordinate indicating a corresponding physical world space is not occupied decreases the probability of physical world occupancy for the voxel coordinate.

In Example 9, the subject matter of Examples 1-8 includes, wherein the block of addresses in the memory is a sequential block of addresses in the memory.

In Example 10, the subject matter of Examples 1-9 includes, wherein the physical world sensor readings are provided by a camera.

In Example 11, the subject matter of Examples 1-10 includes, wherein the physical world sensor readings identify a type of object, color, distance to an object, or physical attribute of the object.

In Example 12, the subject matter of Example 11 includes, wherein the type of object, color, distance to an object, or physical attribute of the object is stored with the voxel data.

In Example 13, the subject matter of Examples 1-12 includes, instructions to: read data stored at a memory addresses within the block of addresses; and determine a coordinate relating to a physical world space using the data and an inverse hash map.

Example 14 is a method for contextual memory mapping, comprising: receiving a data set of physical world sensor readings; generating voxel data from the data set, wherein the voxel data includes, voxel coordinates and an indication of physical world occupancy for each voxel coordinate; selecting a block of addresses in the memory to store the voxel data; generating a hash map to map voxel coordinates to memory locations in the block of addresses, the voxel coordinates having a contextual relationship that is maintained by the hash map; and storing the voxel data at memory addresses within the block of addresses in the memory based on the hash map.

In Example 15, the subject matter of Example 14 includes, wherein the voxel data includes a level of discretization.

In Example 16, the subject matter of Example 15 includes, receiving a coordinate request, wherein the request includes a coordinate, wherein the coordinate identifies a physical world space; identifying a memory address corresponding to the coordinate using the hash map; and returning voxel data from the memory address indicating whether the physical world space identified by the coordinate is occupied.

In Example 17, the subject matter of Example 16 includes, wherein identifying the memory address includes using the level of discretization with the hash map.

In Example 18, the subject matter of Examples 14-17 includes, wherein the voxel data indicates a probability of physical world occupancy.

In Example 19, the subject matter of Example 18 includes, receiving a plurality of physical world sensor readings for a physical world space; and determining the probability of physical world occupancy based on the plurality of physical world sensor readings.

In Example 20, the subject matter of Example 19 includes, wherein receiving at least one physical world sensor reading corresponding to a voxel coordinate indicating a corresponding physical world space is occupied increases the probability of physical world occupancy for the voxel coordinate.

In Example 21, the subject matter of Examples 19-20 includes, wherein receiving at least one physical world sensor reading corresponding to a voxel coordinate indicating a corresponding physical world space is not occupied decreases the probability of physical world occupancy for the voxel coordinate.

In Example 22, the subject matter of Examples 14-21 includes, wherein the block of addresses in the memory is a sequential block of addresses in the memory.

In Example 23, the subject matter of Examples 14-22 includes, wherein the physical world sensor readings are provided by a camera.

In Example 24, the subject matter of Examples 14-23 includes, wherein the physical world sensor readings identify a type of object, color, distance to an object, or physical attribute of the object.

In Example 25, the subject matter of Example 24 includes, wherein the type of object, color, distance to an object, or physical attribute of the object is stored with the voxel data.

In Example 26, the subject matter of Examples 14-25 includes, reading data stored at a memory addresses within the block of addresses; and determining a coordinate relating to a physical world space using the data and an inverse hash map.

Example 27 is at least one computer readable medium including instructions for contextual memory mapping that when executed by at least one processor, cause the at least one processor to: receive a data set of physical world sensor readings; generate voxel data from the data set, wherein the voxel data includes, voxel coordinates and an indication of physical world occupancy for each voxel coordinate; select a block of addresses in the memory to store the voxel data; generate a hash map to map voxel coordinates to memory locations in the block of addresses, the voxel coordinates having a contextual relationship that is maintained by the hash map, and store the voxel data at memory addresses within the block of addresses in the memory based on the hash map.

In Example 28, the subject matter of Example 27 includes, wherein the voxel data includes a level of discretization.

In Example 29, the subject matter of Example 28 includes, instructions to: receive a coordinate request, wherein the request includes a coordinate, wherein the coordinate identifies a physical world space; identify a memory address corresponding to the coordinate using the hash map, and return voxel data from the memory address indicating whether the physical world space identified by the coordinate is occupied.

In Example 30, the subject matter of Example 29 includes, wherein identifying the memory address includes using the level of discretization with the hash map.

In Example 31, the subject matter of Examples 27-30 includes, wherein the voxel data indicates a probability of physical world occupancy.

In Example 32, the subject matter of Example 31 includes, instructions to: receive a plurality of physical world sensor readings for a physical world space; and determine the probability of physical world occupancy based on the plurality of physical world sensor readings.

In Example 33, the subject matter of Example 32 includes, wherein receiving at least one physical world sensor reading corresponding to a voxel coordinate indicating a corresponding physical world space is occupied increases the probability of physical world occupancy for the voxel coordinate.

In Example 34, the subject matter of Examples 32-33 includes, wherein receiving at least one physical world sensor reading corresponding to a voxel coordinate indicating a corresponding physical world space is not occupied decreases the probability of physical world occupancy for the voxel coordinate.

In Example 35, the subject matter of Examples 27-34 includes, wherein the block of addresses in the memory is a sequential block of addresses in the memory.

In Example 36, the subject matter of Examples 27-35 includes, wherein the physical world sensor readings are provided by a camera.

In Example 37, the subject matter of Examples 27-36 includes, wherein the physical world sensor readings identify a type of object, color, distance to an object, or physical attribute of the object.

In Example 38, the subject matter of Example 37 includes, wherein the type of object, color, distance to an object, or physical attribute of the object is stored with the voxel data.

In Example 39, the subject matter of Examples 27-38 includes, instructions to: read data stored at a memory addresses within the block of addresses; and determine a coordinate relating to a physical world space using the data and an inverse hash map.

Example 40 is a system for contextual memory mapping, comprising: means for receiving a data set of physical world sensor readings; means for generating voxel data from the data set, wherein the voxel data includes, voxel coordinates and an indication of physical world occupancy for each voxel coordinate; means for selecting a block of addresses in the memory to store the voxel data; means for generating a hash map to map voxel coordinates to memory locations in the block of addresses, the voxel coordinates having a contextual relationship that is maintained by the hash map; and means for storing the voxel data at memory addresses within the block of addresses in the memory based on the hash map.

In Example 41, the subject matter of Example 40 includes, wherein the voxel data includes a level of discretization.

In Example 42, the subject matter of Example 41 includes, means for receiving a coordinate request, wherein the request includes a coordinate, wherein the coordinate identifies a physical world space; means for identifying a memory address corresponding to the coordinate using the hash map; and means for returning voxel data from the memory address indicating whether the physical world space identified by the coordinate is occupied.

In Example 43, the subject matter of Example 42 includes, wherein identifying the memory address includes using the level of discretization with the hash map.

In Example 44, the subject matter of Examples 40-43 includes, wherein the voxel data indicates a probability of physical world occupancy.

In Example 45, the subject matter of Example 44 includes, means for receiving a plurality of physical world sensor readings for a physical world space; and means for determining the probability of physical world occupancy based on the plurality of physical world sensor readings.

In Example 46, the subject matter of Example 45 includes, wherein receiving at least one physical world sensor reading corresponding to a voxel coordinate indicating a corresponding physical world space is occupied increases the probability of physical world occupancy for the voxel coordinate.

In Example 47, the subject matter of Examples 45-46 includes, wherein receiving at least one physical world sensor reading corresponding to a voxel coordinate indicating a corresponding physical world space is not occupied decreases the probability of physical world occupancy for the voxel coordinate.

In Example 48, the subject matter of Examples 40-47 includes, wherein the block of addresses in the memory is a sequential block of addresses in the memory.

In Example 49, the subject matter of Examples 40-48 includes, wherein the physical world sensor readings are provided by a camera.

In Example 50, the subject matter of Examples 40-49 includes, wherein the physical world sensor readings identify a type of object, color, distance to an object, or physical attribute of the object.

In Example 51, the subject matter of Example 50 includes, wherein the type of object, color, distance to an object, or physical attribute of the object is stored with the voxel data.

In Example 52, the subject matter of Examples 40-51 includes, means for reading data stored at a memory addresses within the block of addresses; and means for determining a coordinate relating to a physical world space using the data and an inverse hash map.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for contextual memory mapping, comprising:
   at least one processor; and
   memory including instructions that, when executed by the at least one processor, cause the at least one processor to:
   receive a data set of physical world sensor readings of a physical area;
   generate voxel data from the data set, wherein the voxel data includes voxel coordinates of the physical area and an indication of physical world occupancy in the physical area for each voxel coordinate;
   select a block of addresses in the memory to store the voxel data;
   generate a hash map to map voxel coordinates to memory locations in the block of addresses based on proximity of the voxel coordinates in the physical area, wherein selection of the memory locations of the voxel coordinates maintains the proximity of the voxel coordinates, the block of addresses represented by a plurality of bits, the plurality of bits separated into blocks of bits, a number of bits dependent on dimensionality of the voxel coordinates, a number of blocks of bits dependent on a maximum level of discretization of voxels within the physical area, each block of bits representing a directional vector that is independent from directional vectors of other blocks and has a vector length that is different than vector lengths of the other blocks; and
   store the voxel data at memory addresses within the block of addresses in the memory based on mappings of the hash map.

2. The system of claim 1, wherein the voxel data includes a level of discretization.

3. The system of claim 2, further comprising instructions to:
   receive a coordinate request, wherein the request includes a coordinate, wherein the coordinate identifies a physical world space;
   identify a memory address corresponding to the coordinate using the hash map; and
   return voxel data from the memory address indicating whether the physical world space identified by the coordinate is occupied.

4. The system of claim 3, wherein identifying the memory address includes using the level of discretization with the hash map.

5. The system of claim 1, wherein the voxel data indicates a probability of physical world occupancy.

6. The system of claim 5, further comprising instructions to:
   receive a plurality of physical world sensor readings for a physical world space; and
   determine the probability of physical world occupancy based on the plurality of physical world sensor readings.

7. The system of claim 6, further comprising instructions to, in response reception of a plurality of write commands of a type "occupied" or "not occupied" in which each write command is in response to at least one of the physical world sensor readings, adjust the probability to increase the probability each time an "occupied" write is requested and decrease the probability each time a "non-occupied" is requested, an amount of increase and decrease configured to vary based on probabilistic models and dependent on a number of physical world sensor readings in each write command.

8. The system of claim 1, wherein the block of addresses in the memory is a sequential block of addresses in the memory.

9. The system of claim 1, wherein the physical world sensor readings are provided by a camera.

10. The system of claim 1, wherein the physical world sensor readings identify a type of object, color, distance to an object, or physical attribute of the object.

11. The system of claim 10, wherein the type of object, color, distance to an object, or physical attribute of the object is stored with the voxel data.

12. The system of claim 1, further comprising instructions to, in response to reception of a request to read information of a memory address in the memory locations, the request having a quantization level:
apply a mask dependent on the quantization level in the request, and
during reading using the mask, skip a number of memory addresses between adjacent memory locations that is dependent on the quantization level in the request.

13. The system of claim 1, further comprising instructions to, in response to reception of a contextual request for a neighbor search related to a particular voxel at a particular voxel coordinate:
determine the particular voxel coordinate based on a memory address associated with the particular voxel coordinate,
add a vector based on a length of the voxel plus a value equal to a minimum discretization level,
apply the value as an offset in a direction indicated by the vector to determine an address in memory of a neighbor voxel and return the address in response to the neighbor voxel having an at most equal quantization level as the particular voxel, and
return a result that indicates all voxels in a same section are neighbors of the particular voxel in response to a determination that the quantization level of the neighbors is higher than the particular voxel.

14. A method for contextual memory mapping, comprising:
receiving a data set of physical world sensor readings of a physical area;
generating voxel data from the data set, wherein the voxel data includes voxel coordinates of the physical area and an indication of physical world occupancy in the physical area for each voxel coordinate;
selecting a block of addresses in the memory to store the voxel data;
generating a hash map to map voxel coordinates to memory locations in the block of addresses based on proximity of the voxel coordinates in the physical area, wherein selection of the memory locations of the voxel coordinates maintains the proximity of the voxel coordinates, the block of addresses represented by a plurality of bits, the plurality of bits separated into blocks of bits, a number of bits dependent on dimensionality of the voxel coordinates, a number of blocks of bits dependent on a maximum level of discretization of voxels within the physical area, each block of bits representing a directional vector that is independent from directional vectors of other blocks and has a vector length that is different than vector lengths of the other blocks; and
storing the voxel data at memory addresses within the block of addresses in the memory based on mappings of the hash map.

15. The method of claim 14, wherein the voxel data includes a level of discretization.

16. The method of claim 15, further comprising:
receiving a coordinate request, wherein the request includes a coordinate, wherein the coordinate identifies a physical world space;
identifying a memory address corresponding to the coordinate using the hash map; and
returning voxel data from the memory address indicating whether the physical world space identified by the coordinate is occupied.

17. The method of claim 16, wherein identifying the memory address includes using the level of discretization with the hash map.

18. The method of claim 14, wherein the voxel data indicates a probability of physical world occupancy.

19. At least one non-transitory computer readable medium including instructions for contextual memory mapping that when executed by at least one processor, cause the at least one processor to:
receive a data set of physical world sensor readings of a physical area;
generate voxel data from the data set, wherein the voxel data includes voxel coordinates of the physical area and an indication of physical world occupancy in the physical area for each voxel coordinate;
select a block of addresses in the memory to store the voxel data;
generate a hash map to map voxel coordinates to memory locations in the block of addresses based on proximity of the voxel coordinates in the physical area, wherein selection of the memory locations of the voxel coordinates maintains the proximity of the voxel coordinates, the block of addresses represented by a plurality of bits, the plurality of bits separated into blocks of bits, a number of bits dependent on dimensionality of the voxel coordinates, a number of blocks of bits dependent on a maximum level of discretization of voxels within the physical area, each block of bits representing a directional vector that is independent from directional vectors of other blocks and has a vector length that is different than vector lengths of the other blocks; and
store the voxel data at memory addresses within the block of addresses in the memory based on mappings of the hash map.

20. The at least one non-transitory computer readable medium of claim 19, wherein the voxel data includes a level of discretization.

21. The at least one non-transitory computer readable medium of claim 20, further comprising instructions to:
receive a coordinate request, wherein the request includes a coordinate, wherein the coordinate identifies a physical world space;
identify a memory address corresponding to the coordinate using the hash map; and
return voxel data from the memory address indicating whether the physical world space identified by the coordinate is occupied.

22. The at least one non-transitory computer readable medium of claim 21, wherein identifying the memory address includes using the level of discretization with the hash map.

23. The at least one non-transitory computer readable medium of claim 19, wherein the voxel data indicates a probability of physical world occupancy.

* * * * *